United States Patent
Schuchardt

(10) Patent No.: US 10,303,700 B1
(45) Date of Patent: May 28, 2019

(54) PREVENTING PAUSES IN ALGORITHMS REQUIRING PRE-IMAGE INFORMATION CONCERNING MODIFICATIONS DURING DATA REPLICATION

(71) Applicant: Pivotal Software, Inc., San Francisco, CA (US)

(72) Inventor: Bruce Schuchardt, Newberg, OR (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 15/665,346

(22) Filed: Jul. 31, 2017

Related U.S. Application Data

(63) Continuation of application No. 14/811,706, filed on Jul. 28, 2015, now Pat. No. 9,720,995, which is a continuation of application No. 14/171,424, filed on Feb. 3, 2014, now Pat. No. 9,128,997, which is a continuation of application No. 12/319,647, filed on Jan. 9, 2009, now Pat. No. 8,645,324.

(51) Int. Cl.
*G06F 16/27* (2019.01)
*G06F 16/23* (2019.01)
*G06F 16/955* (2019.01)

(52) U.S. Cl.
CPC ........ *G06F 16/275* (2019.01); *G06F 16/2365* (2019.01); *G06F 16/955* (2019.01)

(58) Field of Classification Search
CPC ......... G06F 17/30212; G06F 17/30578; G06F 17/30067; G06F 17/30094; G06F 17/30569; G06F 16/20; G06F 16/21; G06F 16/215; G06F 16/214; G06F 16/217; G06F 16/219; G06F 16/275; G06F 16/955; G06F 16/2365

USPC ................................................. 707/200, 626
See application file for complete search history.

(56) References Cited

U.S. PATENT DOCUMENTS

| | | |
|---|---|---|
| 5,664,098 A | 9/1997 | Bianchi et al. |
| 5,857,188 A | 1/1999 | Douglas |
| 5,956,731 A | 9/1999 | Bamford et al. |
| 5,983,012 A | 11/1999 | Bianchi et al. |
| 5,995,945 A | 11/1999 | Notani et al. |
| 6,031,747 A | 2/2000 | Ilic et al. |
| 6,066,181 A | 5/2000 | DeMaster |

(Continued)

FOREIGN PATENT DOCUMENTS

| | | |
|---|---|---|
| CA | 2146170 | 10/1996 |
| GB | 2381092 | 4/2003 |

(Continued)

OTHER PUBLICATIONS

Burd, *Java 2 for Dummies*, User's Manual, Hungry Minds Inc., 2001, 359 pages.

(Continued)

*Primary Examiner* — Michael Pham
(74) *Attorney, Agent, or Firm* — Fish & Richardson P.C.

(57) ABSTRACT

Data accessible to a first process is replicated for use by a second process. Modifications to the data during the replication process may cause algorithms requiring the values of data both before and after replication to pause. Sending the values of the datum, before and after modification, to a process that will access the replicated data enables algorithms that use both values to initiate execution without waiting for the replication process to be completed.

20 Claims, 5 Drawing Sheets

(56) References Cited

U.S. PATENT DOCUMENTS

| | | | |
|---|---|---|---|
| 6,125,401 A | 9/2000 | Huras et al. | |
| 6,247,025 B1 | 6/2001 | Bacon | |
| 6,292,933 B1 | 9/2001 | Bahrs et al. | |
| 6,330,709 B1 | 12/2001 | Johnson et al. | |
| 6,332,130 B1 | 12/2001 | Notani et al. | |
| 6,519,594 B1 | 2/2003 | Li | |
| 6,633,891 B1 | 10/2003 | Bamford et al. | |
| 6,681,226 B2 | 1/2004 | Bretl et al. | |
| 6,687,702 B2 | 2/2004 | Vaitheeswaran et al. | |
| 6,738,977 B1 | 5/2004 | Berry et al. | |
| 6,829,769 B2 | 12/2004 | Cranston et al. | |
| 6,868,543 B1 | 3/2005 | Nusbickel | |
| 7,017,160 B2 | 3/2006 | Martin et al. | |
| 7,035,870 B2 | 4/2006 | McGuire et al. | |
| 7,065,541 B2 | 6/2006 | Gupta et al. | |
| 7,086,048 B1 | 8/2006 | Rau et al. | |
| 7,131,120 B2 | 10/2006 | Veselov | |
| 7,143,392 B2 | 11/2006 | Ii et al. | |
| 7,152,231 B1 | 12/2006 | Galluscio et al. | |
| 7,162,711 B2 | 1/2007 | Czajkowski et al. | |
| 7,171,663 B2 | 1/2007 | Moore et al. | |
| 7,188,125 B1 | 3/2007 | Karr | |
| 7,188,145 B2 | 3/2007 | Lowery et al. | |
| 7,209,977 B2 | 4/2007 | Acharya et al. | |
| 7,216,289 B2 | 5/2007 | Kagle et al. | |
| 7,434,229 B2 | 10/2008 | Barinov et al. | |
| 7,490,133 B1 | 2/2009 | Leban et al. | |
| 7,529,823 B2 | 5/2009 | Trufinescu et al. | |
| 7,610,319 B1 | 10/2009 | Kekre et al. | |
| 7,765,187 B2 | 7/2010 | Bergant et al. | |
| 7,809,691 B1 | 10/2010 | Karmarkar et al. | |
| 7,840,535 B2 | 11/2010 | Barboi et al. | |
| 7,885,923 B1 | 2/2011 | Tawri et al. | |
| 8,005,787 B2 | 8/2011 | Schuchardt | |
| 8,645,324 B2 | 2/2014 | Schuchardt | |
| 9,128,997 B1 | 9/2015 | Schuchardt | |
| 9,720,995 B1 | 8/2017 | Schuchardt | |
| 2001/0014905 A1 | 8/2001 | Onodera et al. | |
| 2001/0039548 A1* | 11/2001 | Shinkai | G06F 17/30194 |
| 2002/0019872 A1 | 2/2002 | Ferwerda et al. | |
| 2003/0033443 A1 | 2/2003 | Igotti | |
| 2003/0056200 A1 | 3/2003 | Li et al. | |
| 2003/0097360 A1 | 5/2003 | McGuire et al. | |
| 2003/0135509 A1 | 7/2003 | Davis et al. | |
| 2004/0078637 A1* | 4/2004 | Fellin | G06F 11/1443 714/6.3 |
| 2004/0133591 A1 | 7/2004 | Holenstein et al. | |
| 2004/0199828 A1 | 10/2004 | Cavezas et al. | |
| 2004/0243571 A1 | 12/2004 | Judd | |
| 2005/0013257 A1 | 1/2005 | Garyfalos et al. | |
| 2005/0086656 A1 | 4/2005 | Whitlock et al. | |
| 2006/0101097 A1 | 5/2006 | Barboi et al. | |
| 2006/0101422 A1 | 5/2006 | Bourges-Waldegg et al. | |
| 2006/0230082 A1 | 10/2006 | Jasrasaria | |
| 2007/0136389 A1* | 6/2007 | Bergant | G06F 11/1435 |
| 2007/0185938 A1* | 8/2007 | Prahlad | G06F 17/30212 |
| 2008/0010322 A1 | 1/2008 | Lee et al. | |
| 2009/0049329 A1* | 2/2009 | Lind | G06F 11/2097 714/3 |
| 2009/0119347 A1* | 5/2009 | Schuchardt | H04L 69/40 |
| 2010/0169275 A1 | 7/2010 | Chen et al. | |
| 2011/0184911 A1 | 7/2011 | Schuchardt | |

FOREIGN PATENT DOCUMENTS

| | | |
|---|---|---|
| JP | 2001188685 | 7/2001 |
| WO | PCT/GB02/05310 | 6/2003 |

OTHER PUBLICATIONS

Chandy and Lamport, "Distributed Snapshots: Determining Global States of Distributed Systems," *ACM Transactions on Computer Systems*, vol. 3, #1, Feb. 1985, 63-75.

Gemfire EDF Technical White Paper, "Perfomance, Availability and Real-time Intelligence . . . Fabric (EDF)," Copyright 2005 by GemStone Systems, Inc., 15 pages.

Gemfire Enterprise Technical White Paper "GemFire Enterprise," Copyright 2007 by GemStone Systems, Inc., 26 pages.

Glass, *Web Services Building Blocks for Distributed Systems*, Prentice Hall, 2002, 55-70.

Haase, "Java™ Message Service API Tutorial," Sun Microsystems, Inc., 2002, 278 pages.

Jaworski, *Java 1.1 Developer's Guide*, Second Edition, Sams.net Publishing, 1997; 3-10; 17-20; 90-92; 372-383; and 983-990.

Meyer and Downing, *Java Virtual Machine*, User's Manual, O'Reilly & Assoc., First Edition, 1997, 446 pages.

Olofson and Lamport, "White Paper: Overcoming the Data Bottleneck to Deliver Dynamic IT: GemStone's GemFire with IBM's BladeCenter," *IDC Information & Data*, 2005.

Silberschatz et al., *Applied Operating System Concepts*, First Edition, John Wiley & Sons, Inc., 2000, 61-64; 74-77; 87-114; and 507-518.

* cited by examiner

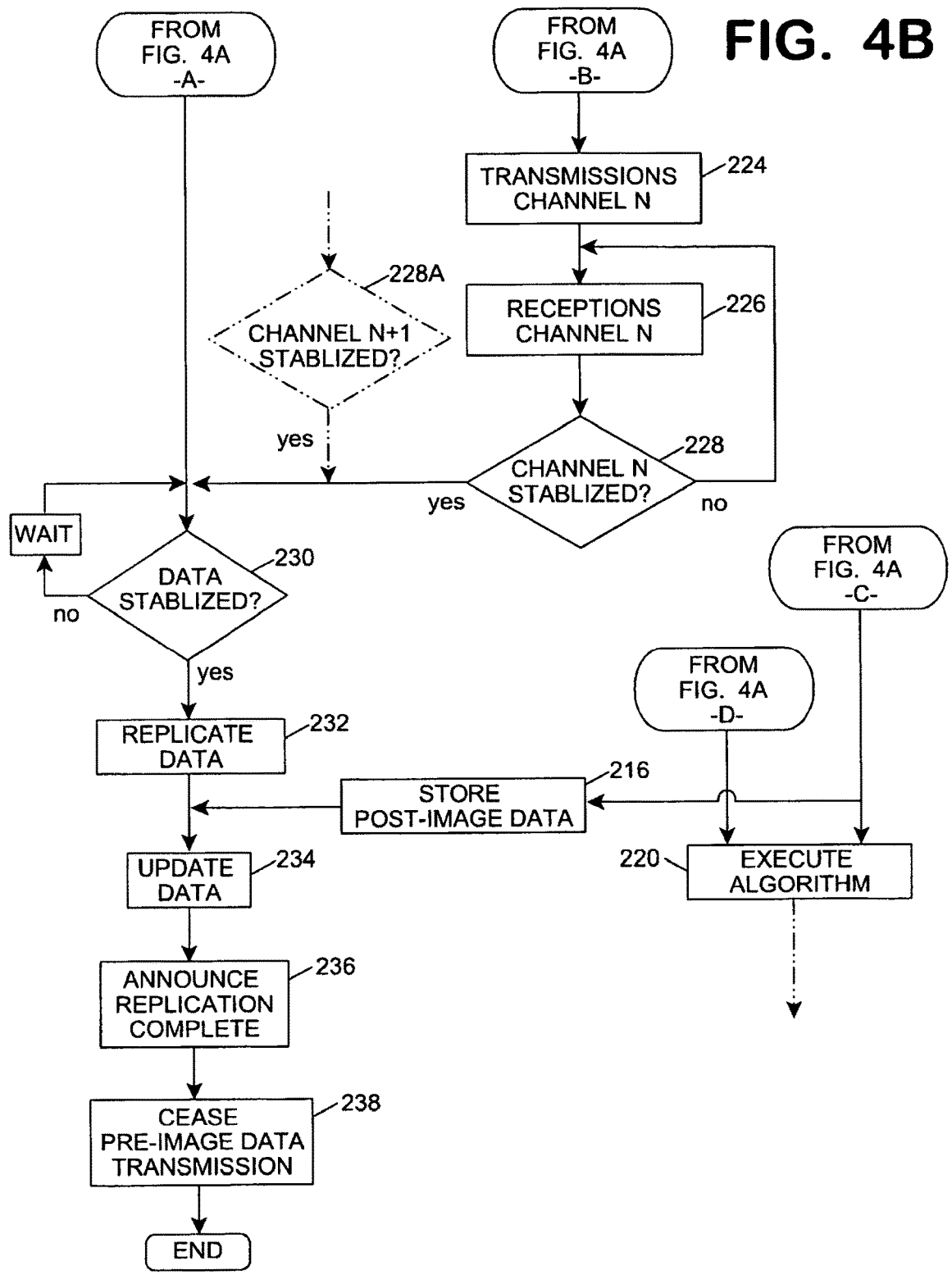

PREVENTING PAUSES IN ALGORITHMS REQUIRING PRE-IMAGE INFORMATION CONCERNING MODIFICATIONS DURING DATA REPLICATION

CROSS-REFERENCE TO RELATED APPLICATIONS

This application is a continuation of, and claims priority to, U.S. patent application Ser. No. 14/811,706, filed on Jul. 28, 2015; which is a continuation of U.S. patent application Ser. No. 14/171,424, filed on Feb. 3, 2014, now U.S. Pat. No. 9,128,997; which is a continuation of U.S. patent application Ser. No. 12/319,647, filed on Jan. 9, 2009, now U.S. Pat. No. 8,645,324. The disclosures of the foregoing applications are incorporated here by reference.

BACKGROUND OF THE INVENTION

The present invention relates to a method of replicating data managed by a data fabric communication network that interconnects the nodes of a distributed computer system and, more particularly, to a method for preventing pauses by algorithms affected by data modifications during the data replication process.

A data fabric is a communication network that interconnects a plurality of distributed computation nodes of a computer system. The distributed computing nodes may be performing a plurality of processes and the data fabric enables the nodes to exchange data and use the data in the performance of the process(es) executing on the local node. The data fabric provides a data infrastructure that distributes and replicates data enabling data to be stored in a distributed memory so that the data may utilized at high rates with low latency and to be frequently updated by a plurality of processes being executed by one or more of the distributed computing nodes of the system.

Distributed data caching is a central feature of a data fabric network, such as the GemFire Enterprise® data fabric from Gemstone Systems Inc. A cache provides temporary storage for data obtained from a data source enabling subsequent local use of the data without the necessity of repeatedly downloading the data from the data source. For example, a data cache may be used to temporarily store, at a local computer, data that is downloaded from an Internet web site. Latency in the use of the data is substantially reduced by the using the data in the local cache rather than downloading the data from a remote source for each use. The replication of data also provides redundant data storage for the system. If a process holding a replica of data fails, the data can be made available from other replicas held by other processes of the system. The GemFire Enterprise data fabric provides data management enabling creation of a plurality of local data caches consistent with the other data sources of the system and the updating of a plurality of replicas of the data to reflect the changes resulting from the use of the data by the nodes of a distributed system.

The GemFire Enterprise data fabric comprises processes enabling data consistency among the various replicas of the data held by the system when a new replica of a data region, a portion of the system's data, is created. Messages communicating changes in the data of a data region are addressed to the various processes of the system holding replicas of the effected data region. When a new replica of the data is to be created, the GemFire Enterprise data fabric notifies the various processes utilizing the data to be replicated of the intention to create a new replica of the data region by copying one of the replicas of the data region held by one of the system's processes and directs the processes to forward any new changes to the data to a new group of processes that includes the process in which the new replica is to be created. The process in which the new replica is to be created stores any changes to the data that are received and, following creation of the new replica, the data of the new replica is updated. All of the processes utilizing the data of the replicated data region capture the changes to the data that were made after the intention to create the new replica is announced to the processes executing on the computing system.

Co-pending U.S. patent application Ser. No. 11/982,563, incorporated herein by reference, discloses an innovative method of replicating system data which addresses the problem of "in-flight" changes to the data, that is, capturing a change to the data that was made by a process prior to receipt of the notice of intention to create a new replica but was not received by the data replica being copied before the data was replicated. In the innovative data replication method, data produced by operations occurring after the intention to replicate is announced are transmitted to all users of the data. The system monitors each of the communication channels connected to the data to be replicated and when each channel has stabilized, the data is replicated and then updated with the changes to the data resulting from operations occurring after the replication was announced. Capturing "in-flight" changes to the data promotes data consistency in a distributed system.

Since data may be modified by operations undertaken by one or more processes before the intent to replicate the data is announced, algorithms requiring knowledge of the values of data before and after modification typically must block or pause and wait for completion of the replication process and the updating of the replicated data. These algorithms may produce events that are of significance to an application and blocking may significantly interrupt or slow the execution of the application. What is desired, therefore, is a method of replicating data that enables algorithms relying on earlier and later versions of data to initiate operation before data replication is completed.

BRIEF DESCRIPTION OF THE DRAWINGS

FIG. 4B is a continuation of the flow diagram of the data replication method illustrated in FIG. 4A.

DETAILED DESCRIPTION OF PREFERRED EMBODIMENTS

Figure 1:
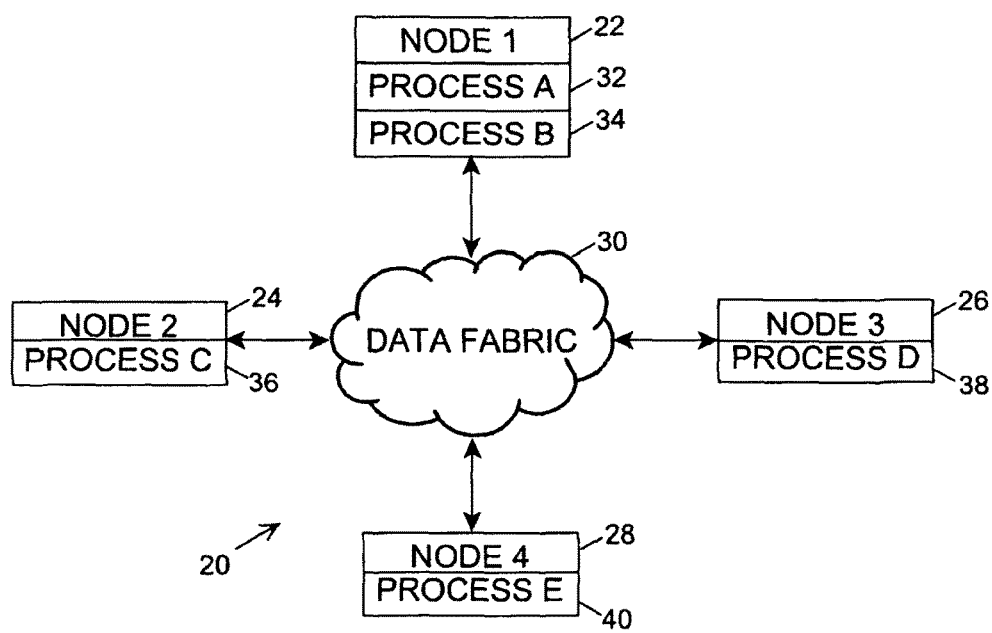
FIG. 1 is a block illustration of a distributed computing system.

Referring in detail to the drawings where similar parts are identified by like reference numerals, and, more particularly to FIG. 1, an exemplary distributed computing system 20 includes a plurality of computing nodes 22, 24, 26, 28 that are communicatively interconnected by a data fabric 30. The type of software executing on the nodes and the type of hardware that implements each node depends upon the application and may vary.

Figure 2:
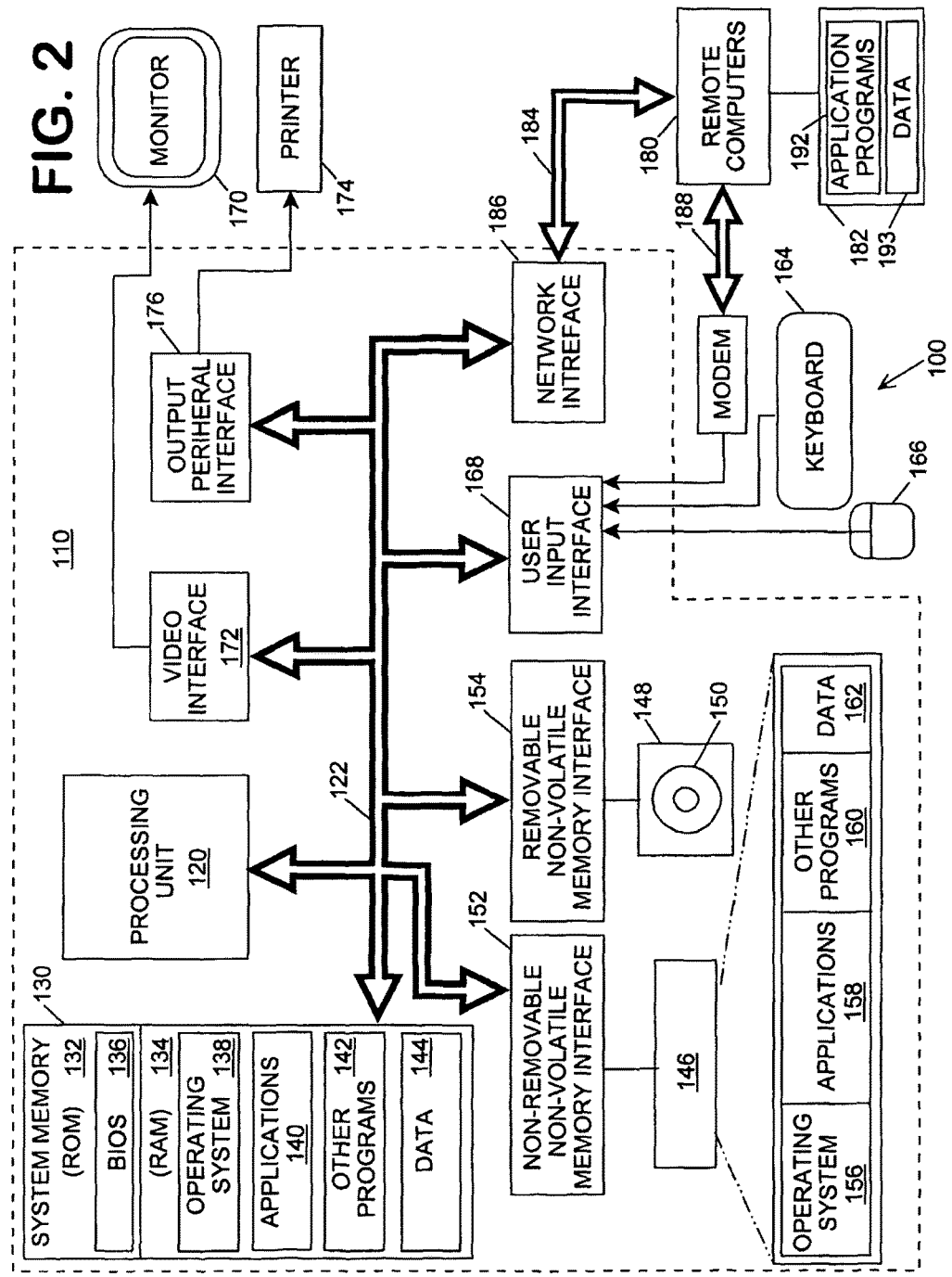
FIG. 2 is a block illustration of a computing system.

For example, the nodes may be personal computers connected to one or more remote computers, such as a server presenting data for a website, as illustrated in FIG. 2. Components of the personal computer 110 may include, but are not limited to, a processing unit 120, a system memory 130, and a system bus 122 that couples various system components including the system memory to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 132 and random access memory (RAM) 134. A basic input/output system 136 (BIOS), containing the basic routines that help to transfer information between elements within computer 110, such as during start-up, is typically stored in ROM. RAM typically contains data and/or program modules that are immediately accessible to and/or presently being operated on by processing unit. By way of example, and not limitation, operating system 138, application programs 140, other program modules 142 and program data 144 are stored on RAM in the computer 110.

The computer may also include other removable/non-removable, volatile/nonvolatile computer storage media. By way of example only, FIG. 2 illustrates non-removable, nonvolatile memory device 146, such as a hard disk drive that reads from or writes to non-removable, nonvolatile magnetic media, removable, nonvolatile memory device 148 that reads from or writes to a removable, nonvolatile storage medium 150, such as a magnetic disk or an optical disk, such as a CD ROM or other optical media. Other removable/non-removable, volatile/nonvolatile computer storage media that can be used in the exemplary computing environment include, but are not limited to, magnetic tape cassettes, flash memory cards, digital versatile disks, digital video tape, solid state RAM, solid state ROM, and the like. The non-removable, nonvolatile storage device is typically connected to the system bus through a non-removable memory interface such as interface 152, and the removable, nonvolatile storage device is typically connected to the system bus by a removable memory interface, such as interface 154.

The storage devices and their associated storage media, discussed above provide storage of computer-readable instructions, data structures, program modules and other data for the computer. In FIG. 2, for example, the non-removable, nonvolatile storage is illustrated as storing operating system 156, application programs 158, other program modules 160 and program data 162. These components can be the same as or different from operating system 138, application programs 140, other program modules 142, and program data 144. Different reference numbers for the operating system, application programs, other program modules, and program data in the different memory location are intended illustrate that, at a minimum, they are different copies. A user may enter commands and information into the computer through input devices such as a keyboard 164 and pointing device 166, commonly referred to as a mouse, trackball or touch pad. Other input devices (not shown) may include a microphone, joystick, game pad, satellite dish, scanner, or the like. These and other input devices are often connected to the processing unit through a user input interface 168 that is coupled to the system bus, but may be connected by other interface and bus structures, such as a parallel port, game port or a universal serial bus (USB). A monitor 170 or other type of display device is also connected to the system bus via an interface, such as a video interface 172. In addition to the monitor, computers may also include other peripheral output devices such as speakers and/or a printer 174, which may be connected through an output peripheral interface 176.

The computer may operate in a networked environment using logical connections to one or more remote computers, such as a remote computer 180. The remote computer 180 may be a personal computer, a server, a router, a network PC, a peer device or other common network node, and typically includes many or all of the elements described above with regard to the computer 110, although only a memory storage device 182 is illustrated in FIG. 1. The logical connections depicted in FIG. 1 include a local area network (LAN) 184 and a wide area network (WAN) 188, but may also include other networks. Such networking environments are commonplace in offices, enterprise-wide computer networks, intranets and the Internet. When used in a LAN networking environment, the computer is connected to the LAN through a network interface or adapter 186. When used in a WAN networking environment, the computer typically includes a modem 188 or other means for establishing communications over the WAN, such as the Internet. The modem, which may be internal or external, may be connected to the system bus via the user input interface or another appropriate mechanism. In a networked environment, program modules depicted relative to the computer 110, or portions thereof, may be stored in the remote memory storage device. By way of example, and not limitation, FIG. 2 illustrates remote application programs 192 and data 193 as residing on the remote memory device 182. It will be appreciated that the network connections shown are exemplary and other means of establishing a communications link between the computers may be used.

The computing system 100 is only one example of a suitable computing environment and is not intended to suggest any limitation as to the scope of use or functionality of the data replication method. The data replication method is operable with numerous other general purpose or special purpose computing system environments or configurations. Examples of well-known computing systems, environments, and/or configurations that may be suitable for use with the invention include, but are not limited to, personal computers, server computers, hand-held or laptop devices, multi-processor systems, microprocessor-based systems, set top boxes, programmable consumer electronics, network PCs, minicomputers, mainframe computers, distributed computing environments that include any of the above systems or devices, and the like. For example, the nodes of the distributed computing system may comprise a number of processors operating in parallel in a single computer. Neither should the computing system 100 be interpreted as having any dependency or requirement relating to any one or combination of components illustrated in the exemplary system.

The data replication method may be described in the general context of computer-executable instructions, such as program modules, being executed by a computer. Generally, program modules include routines, programs, objects, components, data structures, and so forth that perform particular tasks or implement particular abstract data types. The data replication method particularly suited for use in distributed computing environments where tasks are performed by remote computing devices that are linked through a communications network. In a distributed computing environment, program modules may be located in both local and remote computer storage media including memory storage devices.

Each node of the distributed computing system 20 may be executing one or more programs or processes 32, 34, 36, 38, 40 and some of the processes may utilize data which is held by one or more other processes and may, as a result of execution of the process, alter the values of the data held by the other process(es). The data fabric 30 provides an operational data infrastructure that distributes and replicates data to enable storage of the data across a memory that may distributed among a plurality of the nodes. Distributed storage and replication of data enables processes to rapidly access the data from a local cache reducing the latency of the computing system and provides redundancy enabling the computing system to continue to access the data even if a process holding the data fails.

Figure 3:
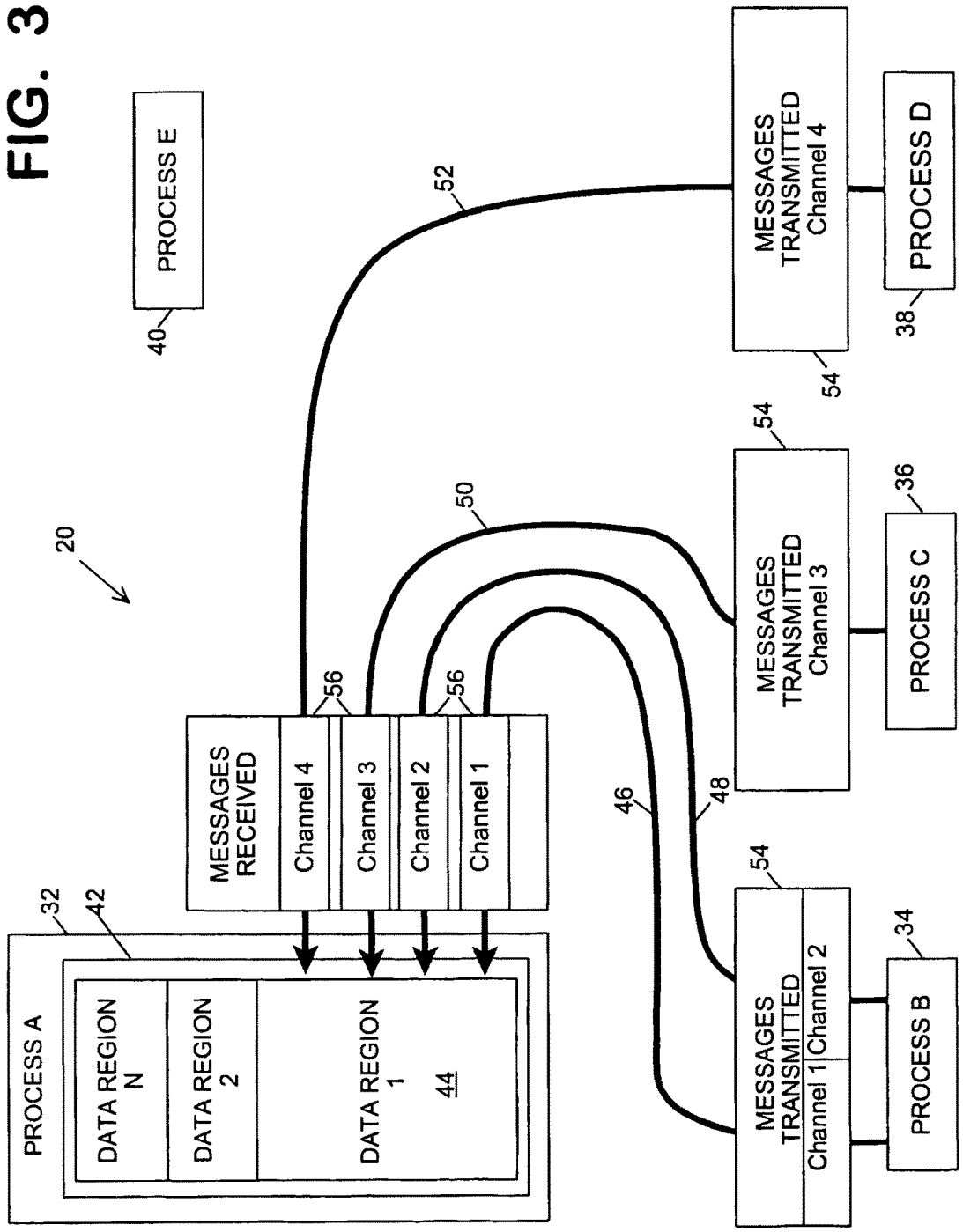
FIG. 3 is a block illustration of a plurality of processes utilizing data from a source.

Referring to FIG. 3, in a second representation of the exemplary distributed computing system 20 a process A (32) executing on the system holds a plurality of data 42. The data may be divided into a plurality of data regions, such as data region 1 (44). Typically, the data regions comprise a plurality of like or related data. Four processes, process A, process B (34), process C (36), and process D (38) are being executed on the exemplary system. All of the processes are using the data of data region 1 and, typically, holding replicas of the region's data.

When one of the processes B-D, alters a datum of data region 1, the change is transmitted to the group of processes using the datum or holding replicas of data region 1. The change is transmitted to process A over one of a plurality of communication channels, channel 1 (46), channel 2 (48), channel 3 (50) and channel 4 (52), that connect data region 1 to the respective processes that utilize the regions' data. If process B changes the data of data region 1, a message with the new value of the data is transmitted to the data region over either communication channel 1 or communication channel 2. Similarly, a change to data region 1 produced by process C is transmitted to data region 1 over communication channel 3 and a change to the data region by process D is transmitted over communication channel 4. At anytime, processes B, C, or D may be executing an operation that alters data region 1 and one or more messages reflecting change(s) in the data may be in transit to the data region on one of the communication channels that interconnects the processes and data region 1.

The message traffic of each of the communication channels of the computing system 20 is monitored by the computing system. A transmission monitor 54 monitors message transmissions on each communication channel and a reception monitor 56 tracks the receipt of messages for each channel. The monitors may comprise counters that log the number of messages transmitted and received or may comprise another device that tracks another metric that indicates that a message received by the data region from a communication channel is as current as the messages transmitted over the channel.

Figure 4A:
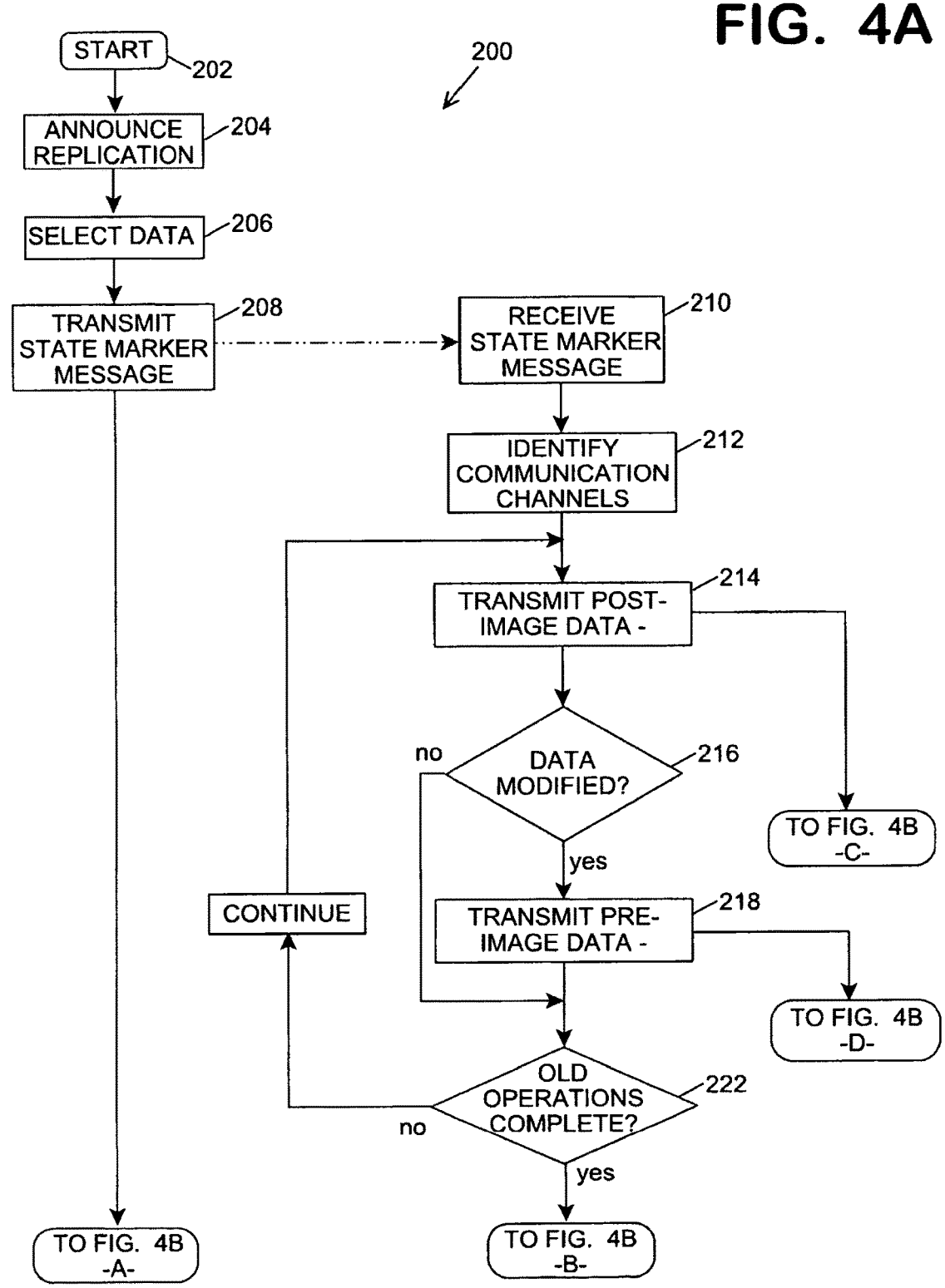
FIG. 4A is a flow diagram of a portion of a method of replicating data.

To provide redundant data storage, a local data cache to reduce latency, or to suit another purpose, it is desired that the data of data region 1 be replicated in process E (40) executing on the distributed computing system. Referring to FIGS. 4A and 4B, the process of data replication 200 is initiated 202 when data region 1 is selected for replication 206 in, for example, Process E. The intention to replicate the data region is announced to the processes executing on the system 204 and a state marker message is transmitted to each of the processes using or holding a replica of data region 1 (212). The state marker message causes an image of the data that is to be replicated to be captured. When the state marker message is received 210, each process identifies the communication channel(s) 212 that connects it to the replica of data region 1 in Process A. The processes utilizing or holding replicas of data region 1 are directed to communicate all changes in the data of data region 1, resulting from operations undertaken subsequent to the receipt of the notice of intent to replicate, to a new group of recipients that includes the process, Process E, in which the new replica will be created 214. The process in which the new replica will be created, Process E, stores the changes or "post-image data" resulting from operations undertaken subsequent to the state marker message 216. Operations undertaken before receipt of the state marker message continue and any changes to the data of data region 1 are also transmitted to all holders of the existing replicas of data region 1, including Process A. If the operations modify the data of the data region being replicated after the data is captured 216, the value of the data before the modification or "pre-image" data is also transmitted to Process E 218. Pre-image and post-image data can be input to algorithms of Process E requiring knowledge of the values of the data, both before and after alteration by an operation, after the receipt of the state marker message enabling the algorithm to begin executing 220 before the data replication is completed.

With the completion of operations undertaken before receipt of the state marker message 222, the state of each communication channel is determined. The status of the transmission monitor for each communication channel connected to the replica of the data to be copied is determined 224. For example, the number of messages transmitted to the existing group of users or holders of existing replicas of the data region is determined. Likewise, the status of reception monitor is determined 226. If messages directed to the group of processes using or holding a replica of data region 1 have been transmitted over a communication channel but have not been received by data region 1, the system continues monitoring the communication channel 228. If all of the messages that have been transmitted over the communication channel to existing holders or users of the data have been received 228, the communication channel is stabilized. The data included in the replica of data region 1 held by Process A has stabilized 230 when all of the communication channels connected to Process A's replica of data region 1 have stabilized 228, 228A. Alternatively, when all of the communication channels connecting a process and Process A's replica of data region 1 have stabilized then the data of the replica has stabilized as to the respective process. Process E may be notified that the data to be replicated has stabilized with respect to a process when all of the communication channels connecting the process and the replica of the data have stabilized or when all communication channels communicating changes to the replica to be copied have stabilized.

When the data of Process A's replica of data region 1 has stabilized with respect to all processes 230, that is, when all of the messages addressed to existing holders and users of the data to be copied and transmitted to the replica of data region 1 held by Process A over all of the communication channels connecting the system's processes to the replica of data region 1 have been received, the data region is replicated in Process E 232. When replication is complete, the new replica in Process E is updated 234 from the stored "post-image" data completing the replication process. The completion of replication is announced to all processes of the group holding replicas of data region 1 (236) and the transmission of pre-image data ceases 238. The result of any subsequent operation on the data is communicated to all replicas of the data, including the replica held by Process E.

The data replication process ensures data consistency by monitoring the communication channel(s) communicating changes to the data that is to be replicated to determine if changes are "in flight" from one or more processes. "In flight" changes are incorporated in the data to be replicated to prevent newer data from being overwritten by older data that is contained in the data region that is being copied. Algorithms utilizing before and after values of modified data are not required to pause and await completion of operations that were undertaken, but not completed, before the data region was imaged reducing latency in distributed computing systems.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

I claim:

1. A method performed by a distributed computing system executing a plurality of processes, the processes including (i) a first process that executes on a first node and maintains a data region and (ii) a second process that executes on a second node and is associated with the data region, the method comprising:
   receiving, by the first process, a state marker message representing an intent to create a replica of the data region;
   providing, by the first process, one or more post-image changes to first data of the data region, the one or more post-image changes being made after the state marker message was received;
   receiving, by the second node, one or more post-image changes to first data of the data region made after the state marker message was received;
   continuing, by the second node, the second process using the one or more post-image changes to the first data region before the data region has been fully replicated;
   waiting to initiate replication of the data region until the data region maintained by the first process has stabilized;
   determining that the data of the data region maintained by the first process has stabilized;
   in response to determining that the data of the data region has stabilized, starting replication of the data region maintained by the first process to generate a replica of the data region maintained by the second process; and
   updating the replica of the data region maintained by the second process with the one or more post-image changes to the first data of the data region.

2. The method of claim 1, wherein determining that the data of the data region has stabilized comprises:
   identifying one or more messages issued by one or more other processes before the state marker message was issued, each message communicating a change to the data region maintained by the first process, and
   determining that all of the one or more messages issued by the one or more other processes before the state marker message was issued have been received by the first process.

3. The method of claim 2, wherein waiting to initiate replication of the image of the data region until the data region maintained by the first process has stabilized comprises waiting for the first node to receive one or more messages issued by the one or more other processes before the state marker message was issued.

4. The method of claim 1, further comprising:
   in response to receiving, by the first node, the state marker message, generating, by the first process, an image of the data region maintained by the first process.

5. The method of claim 1, wherein the second process uses one or more pre-image changes to the data region that were issued before the state marker message was received.

6. The method of claim 1, further comprising transmitting the post-image data to the second process before transmitting the pre-image data to the second process.

7. The method of claim 1, wherein, at a time of starting replication of the data region maintained by the first process, the second process does not maintain a replica of the data region.

8. A system comprising a plurality of computers, the system executing, on the plurality of computers, a plurality of processes, the processes including (i) a first process that executes on a first node and maintains a data region and (ii) a second process that executes on a second node and is associated with the data region, the system further comprising one or more non-transitory storage devices storing instructions that are operable, when executed by the system, to cause the system to perform operations comprising:
 receiving, by the first process, a state marker message representing an intent to create a replica of the data region;
 providing, by the first process, one or more post-image changes to first data of the data region, the one or more post-image changes being made after the state marker message was received;
 receiving, by the second node, one or more post-image changes to first data of the data region made after the state marker message was received;
 continuing, by the second node, the second process using the one or more post-image changes to the first data region before the data region has been fully replicated;
 waiting to initiate replication of the data region until the data region maintained by the first process has stabilized;
 determining that the data of the data region maintained by the first process has stabilized;
 in response to determining that the data of the data region has stabilized, starting replication of the data region maintained by the first process to generate a replica of the data region maintained by the second process; and
 updating the replica of the data region maintained by the second process with the one or more post-image changes to the first data of the data region.

9. The system of claim 8, wherein determining that the data of the data region has stabilized comprises:
 identifying one or more messages issued by one or more other processes before the state marker message was issued, each message communicating a change to the data region maintained by the first process, and
 determining that all of the one or more messages issued by the one or more other processes before the state marker message was issued have been received by the first process.

10. The system of claim 9, wherein waiting to initiate replication of the image of the data region until the data region maintained by the first process has stabilized comprises waiting for the first node to receive one or more messages issued by the one or more other processes before the state marker message was issued.

11. The system of claim 8, wherein the operations further comprise:
 in response to receiving, by the first node, the state marker message, generating, by the first process, an image of the data region maintained by the first process.

12. The system of claim 8, wherein the second process uses one or more pre-image changes to the data region that were issued before the state marker message was received.

13. The system of claim 8, wherein the operations further comprise:
 transmitting the post-image data to the second process before transmitting the pre-image data to the second process.

14. The system of claim 8, wherein, at a time of starting replication of the data region maintained by the first process, the second process does not maintain a replica of the data region.

15. One or more computer-readable non-transitory storage media encoded with instructions that, when executed by a system executing a plurality of processes, the processes including (i) a first process that executes on a first node and maintains a data region and (ii) a second process that executes on a second node and is associated with the data region, cause the system to perform operations comprising:
 receiving, by the first process, a state marker message representing an intent to create a replica of the data region;
 providing, by the first process, one or more post-image changes to first data of the data region, the one or more post-image changes being made after the state marker message was received;
 receiving, by the second node, one or more post-image changes to first data of the data region made after the state marker message was received;
 continuing, by the second node, the second process using the one or more post-image changes to the first data region before the data region has been fully replicated;
 waiting to initiate replication of the data region until the data region maintained by the first process has stabilized;
 determining that the data of the data region maintained by the first process has stabilized;
 in response to determining that the data of the data region has stabilized, starting replication of the data region maintained by the first process to generate a replica of the data region maintained by the second process; and
 updating the replica of the data region maintained by the second process with the one or more post-image changes to the first data of the data region.

16. The one or more storage media of claim 15, wherein determining that the data of the data region has stabilized comprises:
 identifying one or more messages issued by one or more other processes before the state marker message was issued, each message communicating a change to the data region maintained by the first process, and
 determining that all of the one or more messages issued by the one or more other processes before the state marker message was issued have been received by the first process.

17. The one or more storage media of claim 16, wherein waiting to initiate replication of the image of the data region until the data region maintained by the first process has stabilized comprises waiting for the first node to receive one or more messages issued by the one or more other processes before the state marker message was issued.

18. The one or more storage media of claim 15, wherein the operations further comprise:
 in response to receiving, by the first node, the state marker message, generating, by the first process, an image of the data region maintained by the first process.

19. The one or more storage media of claim 15, wherein the second process uses one or more pre-image changes to the data region that were issued before the state marker message was received.

20. The one or more storage media of claim 15, wherein the operations further comprise:
 transmitting the post-image data to the second process before transmitting the pre-image data to the second process.

* * * * *